(12) United States Patent
Armstrong et al.

(10) Patent No.: US 7,785,747 B2
(45) Date of Patent: *Aug. 31, 2010

(54) STACK CONFIGURATIONS FOR TUBULAR SOLID OXIDE FUEL CELLS

(75) Inventors: Timothy R. Armstrong, Clinton, TN (US); Michael P. Trammell, Clinton, TN (US); Joseph A. Marasco, Kingston, TN (US)

(73) Assignee: Worldwide Energy, Inc. of Delaware, Oak Ridge, TN (US)

( * ) Notice: Subject to any disclaimer, the term of this patent is extended or adjusted under 35 U.S.C. 154(b) by 1055 days.

This patent is subject to a terminal disclaimer.

(21) Appl. No.: 11/103,333

(22) Filed: Apr. 11, 2005

(65) Prior Publication Data

US 2006/0228615 A1    Oct. 12, 2006

(51) Int. Cl.
*H01M 8/12* (2006.01)
*H01M 8/24* (2006.01)

(52) U.S. Cl. .................. 429/459; 429/466; 429/471; 429/497

(58) Field of Classification Search ............ 429/31, 429/32, 38, 39
See application file for complete search history.

(56) References Cited

U.S. PATENT DOCUMENTS

| | | | |
|---|---|---|---|
| 4,395,468 A | 7/1983 | Isenberg | |
| 4,490,444 A | 12/1984 | Isenberg | |
| 4,728,584 A | 3/1988 | Isenberg | |
| 5,741,605 A | 4/1998 | Gillett et al. | |
| 6,416,897 B1 | 7/2002 | Tomlins et al. | |
| 6,423,436 B1 | 7/2002 | George et al. | |
| 6,572,996 B1 * | 6/2003 | Isenberg et al. | 429/31 |
| 6,936,367 B2 * | 8/2005 | Sarkar et al. | 429/31 |
| 2002/0197520 A1 | 12/2002 | Quick et al. | |
| 2007/0141424 A1 * | 6/2007 | Armstrong et al. | 429/32 |

FOREIGN PATENT DOCUMENTS

| | | |
|---|---|---|
| CA | 2 509 905 A1 | 7/2004 |
| DE | 102 19 096 A1 | 11/2003 |
| EP | 0 932 214 A2 | 7/1999 |

(Continued)

OTHER PUBLICATIONS

European Patent Office, "International Search Report and Written Opinion," Nov. 30, 2006.

(Continued)

*Primary Examiner*—Stephen J. Kalafut
(74) *Attorney, Agent, or Firm*—Novak Druce + Quigg LLP; Gregory A. Nelson; Gregory M. Lefkowitz

(57) ABSTRACT

A fuel cell unit includes an array of solid oxide fuel cell tubes having porous metallic exterior surfaces, interior fuel cell layers, and interior surfaces, each of the tubes having at least one open end; and, at least one header in operable communication with the array of solid oxide fuel cell tubes for directing a first reactive gas into contact with the porous metallic exterior surfaces and for directing a second reactive gas into contact with the interior surfaces, the header further including at least one busbar disposed in electrical contact with at least one surface selected from the group consisting of the porous metallic exterior surfaces and the interior surfaces.

19 Claims, 19 Drawing Sheets

FOREIGN PATENT DOCUMENTS

| | | |
|---|---|---|
| EP | 0 932 214 A3 | 1/2005 |
| WO | 01/71841 A2 | 9/2001 |
| WO | 01/71841 A3 | 9/2001 |
| WO | 02/37589 A3 | 5/2002 |
| WO | WO 02/37589 A2 | 5/2002 |
| WO | 02/099917 A2 | 12/2002 |
| WO | 2006/110686 A3 | 10/2006 |

OTHER PUBLICATIONS

European Patent Office, "International Search Report and Written Opinion," Jul. 9, 2007.

* cited by examiner

STACK CONFIGURATIONS FOR TUBULAR SOLID OXIDE FUEL CELLS

The United States Government has rights in this invention pursuant to contract no. DE-AC05-00OR22725 between the United States Department of Energy and UT-Battelle, LLC.

FIELD OF THE INVENTION

The present invention relates to stack configurations for tubular solid oxide fuel cells (TSOFC), and more particularly to stack configurations for TSOFC having metallic support tubes with interior fuel cell membranes.

BACKGROUND OF THE INVENTION

Devices commonly known as fuel cells comprise plates or tubes that directly convert to electricity the energy released by oxidation of hydrogen. Fuel cells offer the potential for a clean, quiet, and efficient power source for portable electric generation. Solid oxide fuel cells (SOFC), particularly tubular solid oxide fuel cells (TSOFC), are particularly attractive candidates for applications in distributed or centralized power applications.

SOFC technology has the potential for providing high, power densities, long, stable performance lifetimes, the ability to utilize a broad source of fuels without expensive reforming or gas cleanup, and provide high system efficiencies for a wide range of power generation for transportation.

Critical limitations of the current state of SOFC technology such as long startup times (generally many minutes to hours) and high cost of materials manufacture have significantly impacted consideration thereof for automotive applications.

OBJECTS OF THE INVENTION

Accordingly, objects of the present invention include: provision of SOFC configurations that minimize the use of costly materials, minimize manufacturing costs, minimize startup times, and maximize power generation efficiency. Further and other objects of the present invention will become apparent from the description contained herein.

SUMMARY OF THE INVENTION

In accordance with one aspect of the present invention, the foregoing and other objects are achieved by a fuel cell unit that includes an array of solid oxide fuel cell tubes having porous metallic exterior surfaces, interior fuel cell layers, and interior surfaces, each of the tubes having at least one open end; and, at least one header in operable communication with the array of solid oxide fuel cell tubes for directing a first reactive gas into contact with the porous metallic exterior surfaces and for directing a second reactive gas into contact with the interior surfaces, the header further including at least one busbar disposed in electrical contact with at least one surface selected from the group consisting of the porous metallic exterior surfaces and the interior surfaces.

BRIEF DESCRIPTION OF THE DRAWINGS

Equivalent elements in the figs. are identified with like numerals.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 8:
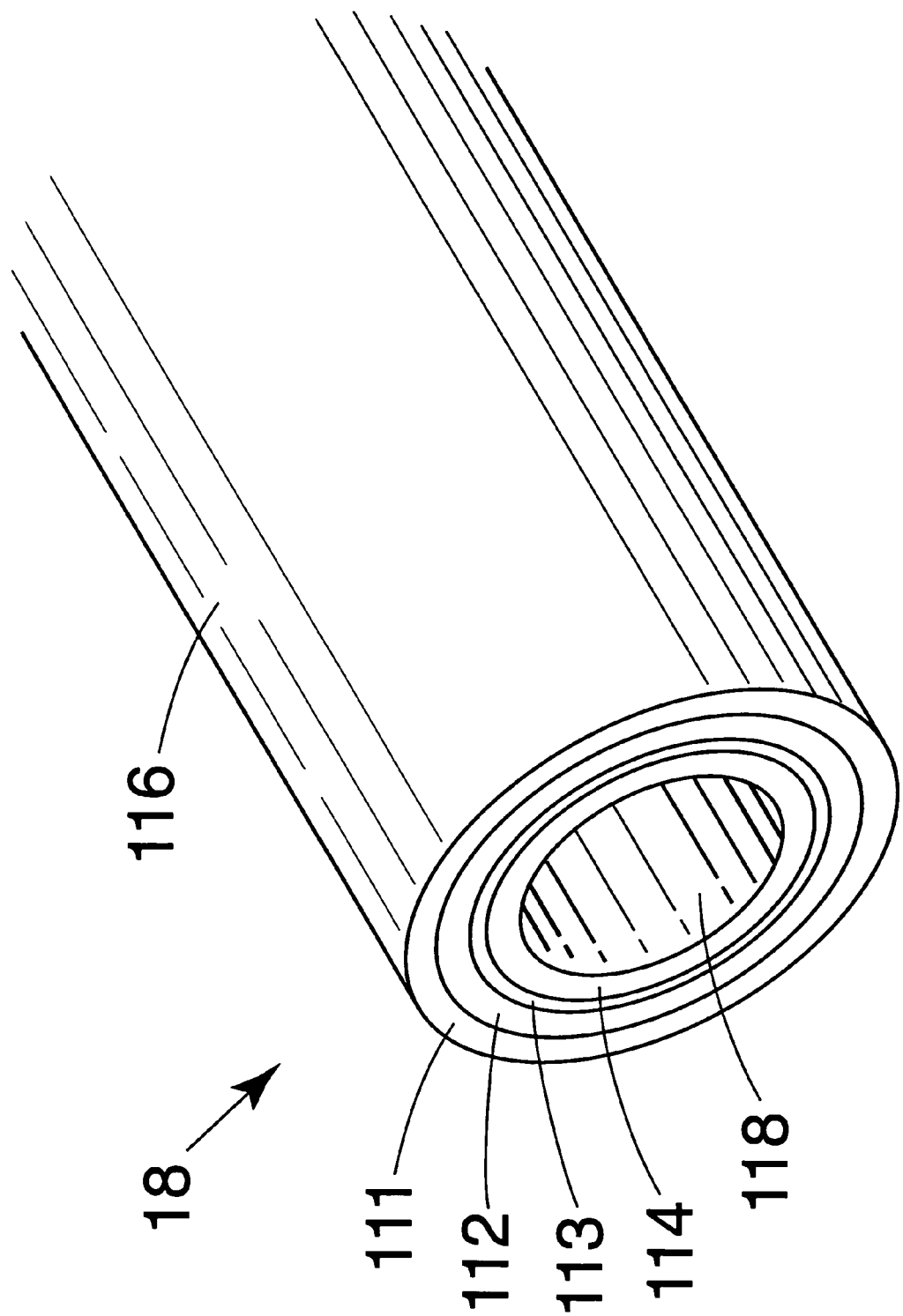
FIG. 8 is an oblique, not-to-scale view of a fuel cell tube in accordance with the present invention.

The present invention improves TSOFC by using a combination of an exterior, preferably metallic support structure and interior membranes in unique stack configurations. Referring to FIG. 8, an example of a TSOFC tube 18 having a circular cross-section is shown. The tube 18 is open on both ends. A porous metal support tube 111 is coated on the inside with a porous anode 112 such as Ni—Ni Yttria stabilized zirconia (YSZ), for example. The anode 112 is coated on the inside with a dense electrolyte 113 such as $Y_2O_3$—$ZrO_2$, for example. The dense electrolyte 113 is coated on the inside with a porous cathode 114 such as $LaMnO_3$, for example. The compositions used to make the TSOFC tube are not critical to the present invention. Moreover, the anode and cathode layers can be interchanged. The tube 18 has an outer surface 116 and an inner surface 118.

Figure 1:
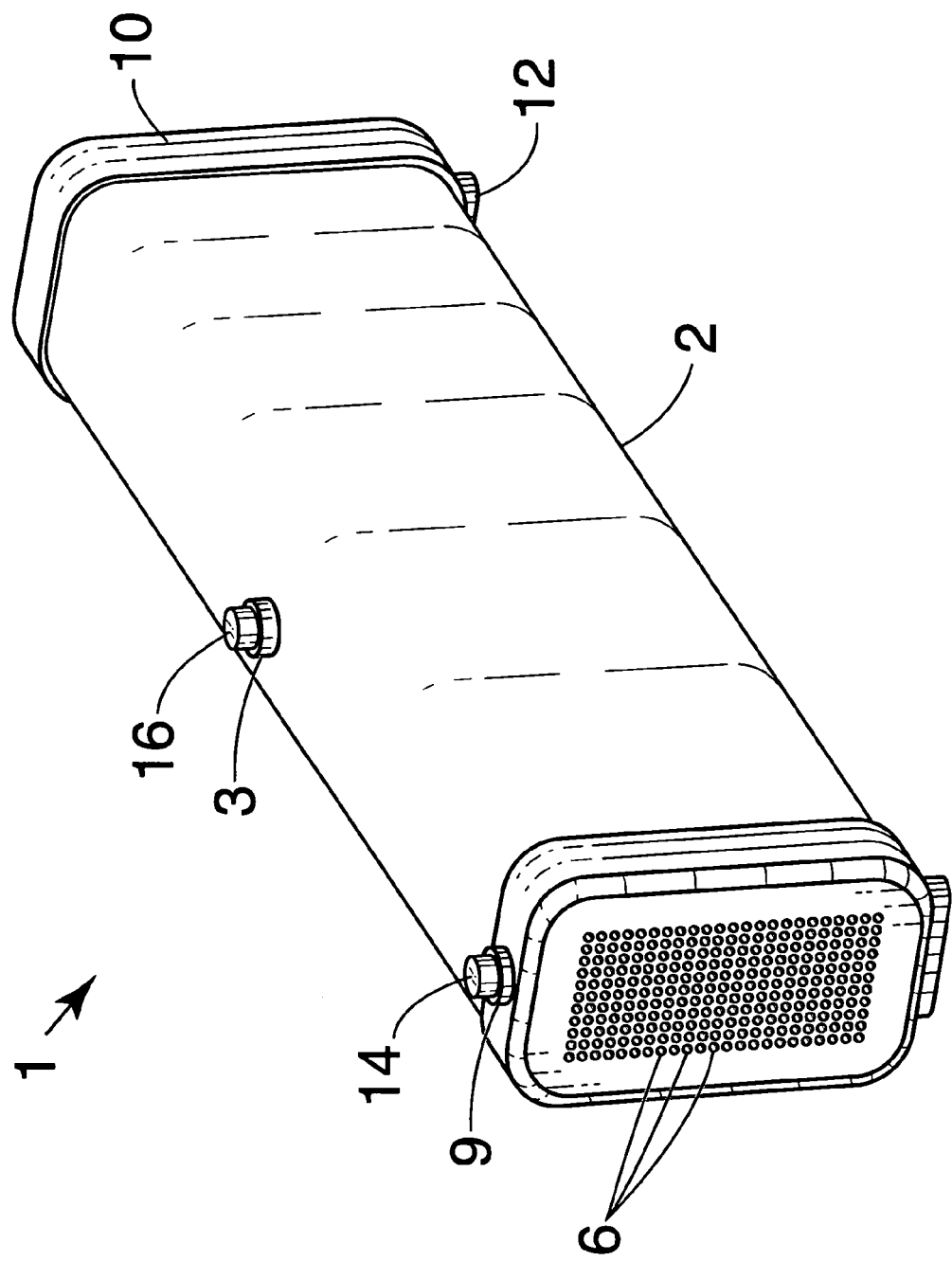
FIG. 1 is an oblique view of a fuel cell assembly in accordance with the present invention.
Figure 2A:
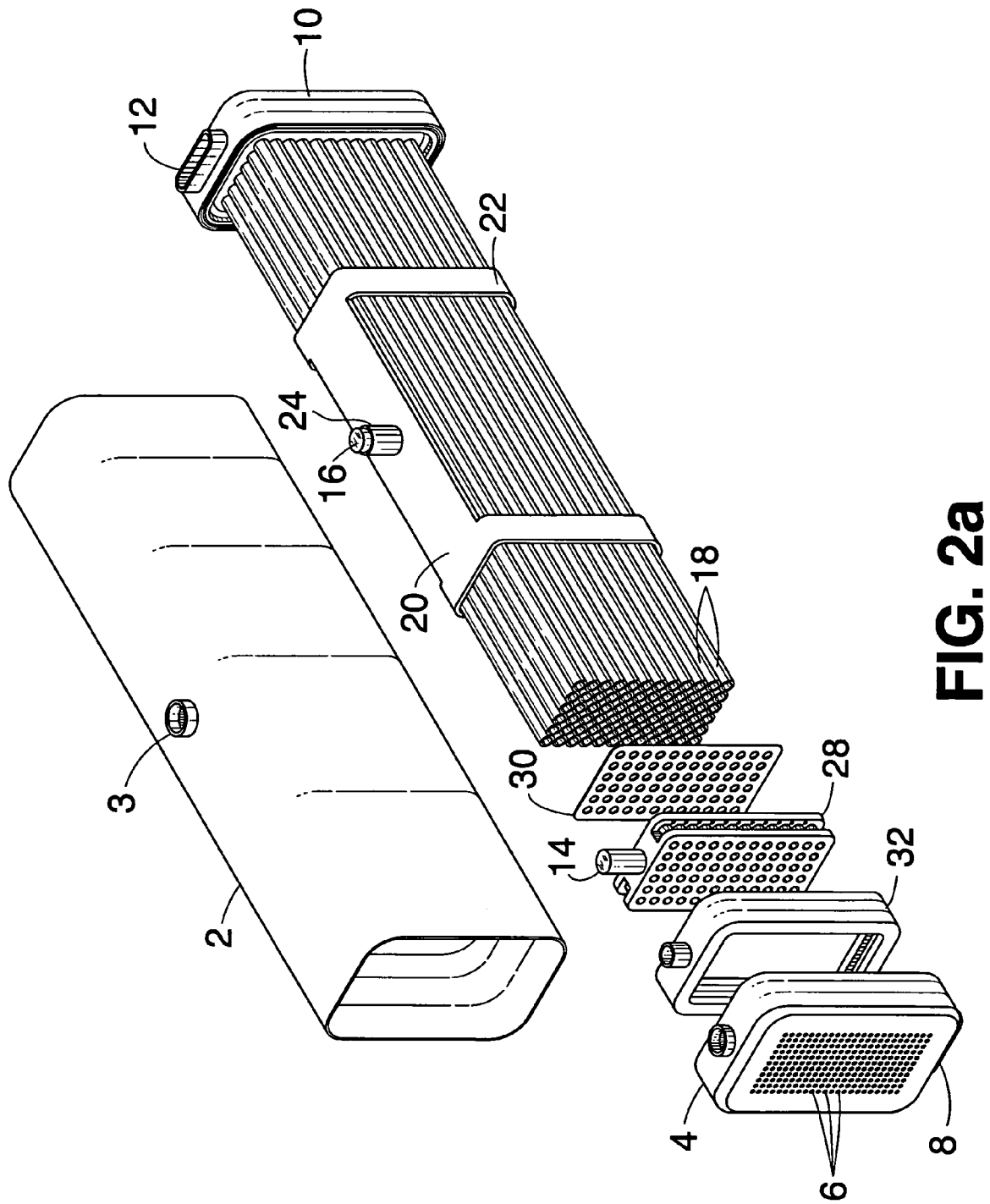
FIG. 2a is an oblique, exploded view of a fuel cell assembly having a close packed configuration in accordance with the present invention.
Figure 2C:
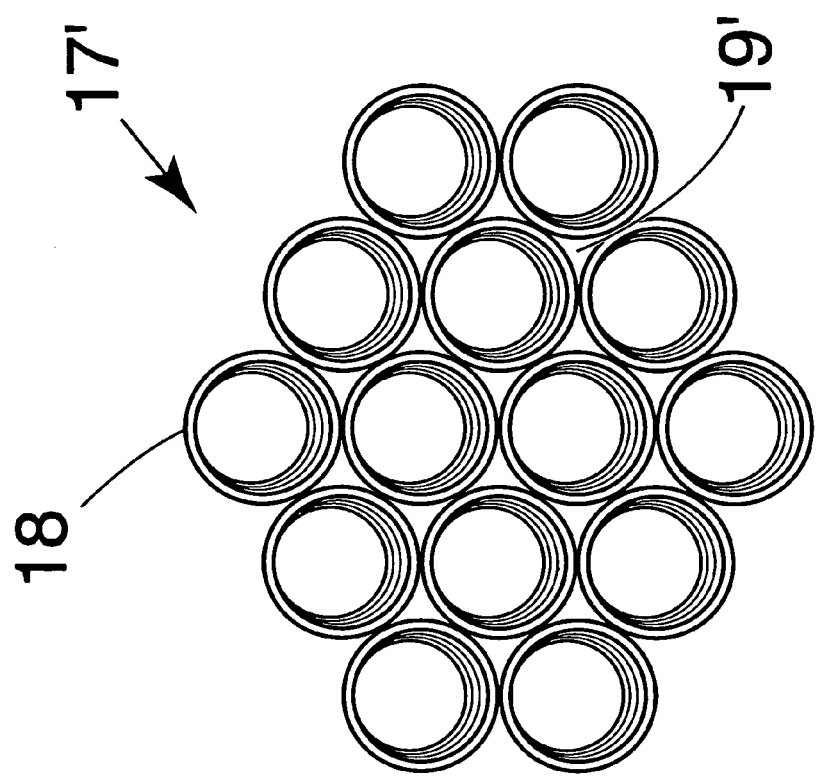
FIG. 2c is a schematic, partial end view of a close packed configuration fuel cell tube assembly in accordance with the present invention.
Figure 2B:
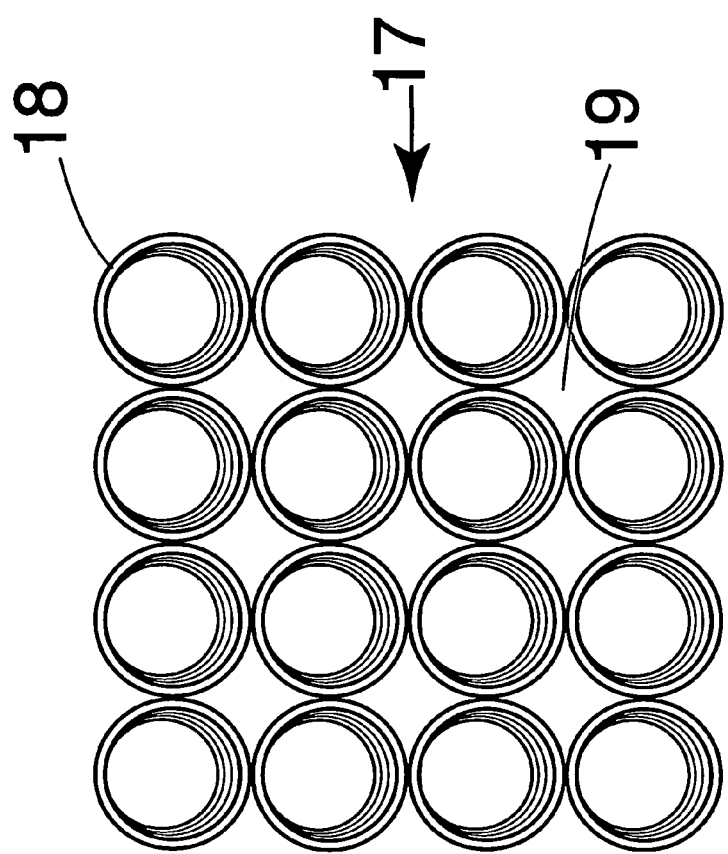
FIG. 2b is a schematic, partial end view of a close packed configuration fuel cell tube assembly in accordance with the present invention.
Figure 3:
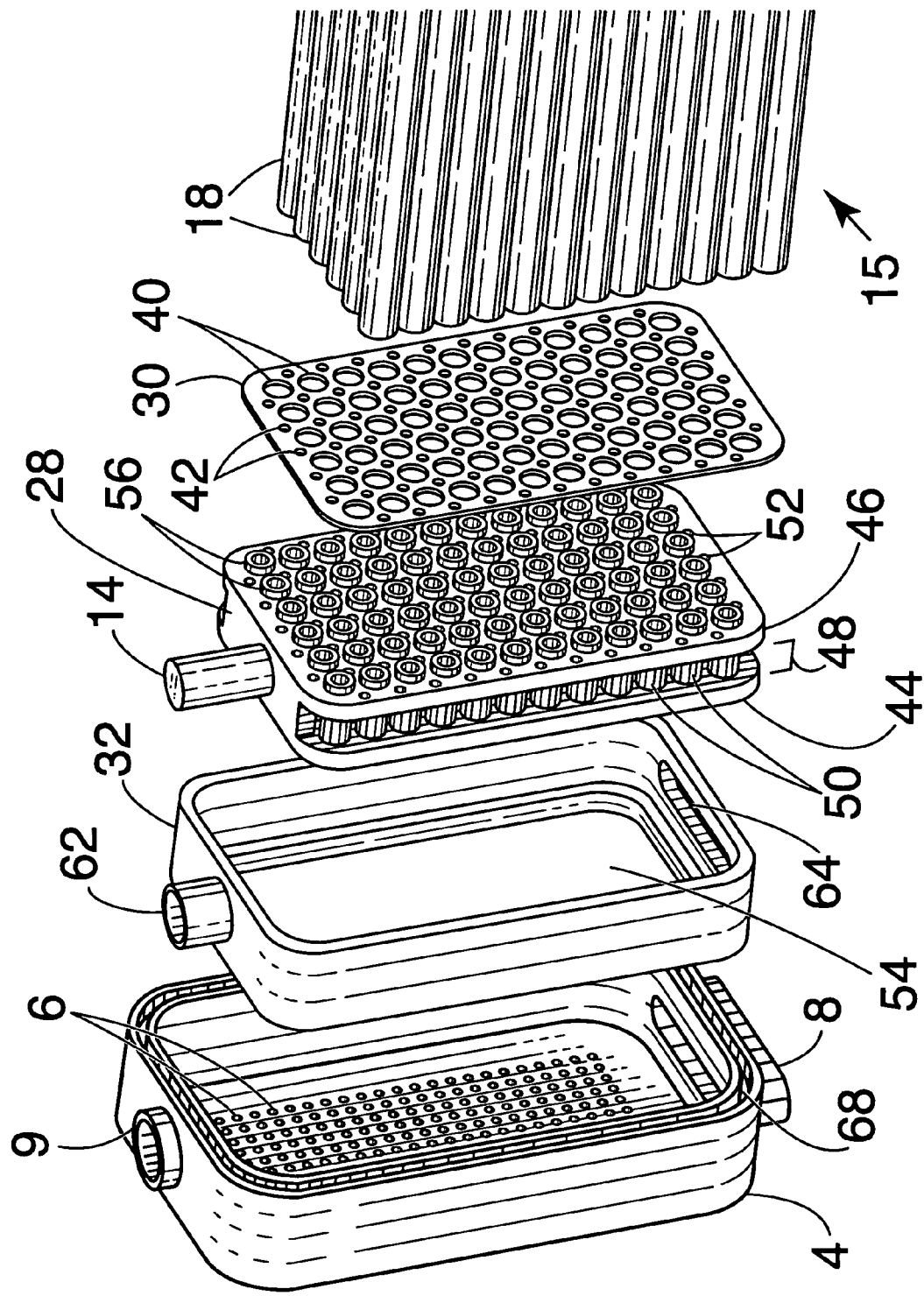
FIG. 3 is an oblique, exploded, partial view of a fuel cell assembly in accordance with the present invention.
Figure 4:
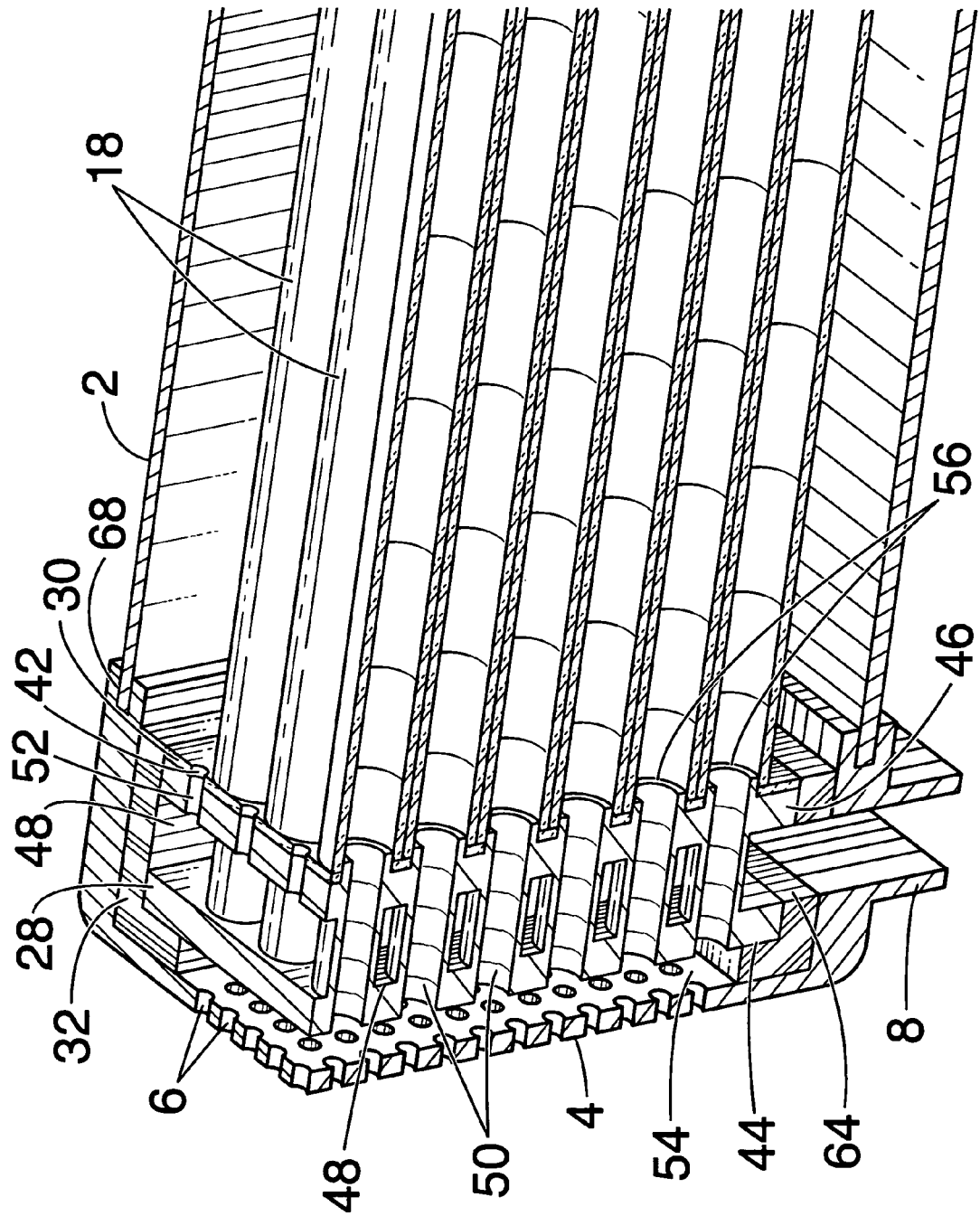
FIG. 4 is an oblique, cutaway, partial view of a fuel cell assembly in accordance with the present invention.

FIG. 1 shows an assembled TSOFC unit 1, which comprises a housing (case) 2 and end caps 4, 10. An intake end cap 4 has openings 6 to admit air into the unit 1, a fuel inlet 8, and a flanged port 9 for an "interior" electrical terminal 14, the flange accommodating a seal and/or electrical insulation. An exhaust end cap 10 has a fuel exhaust port 12 and air exhaust openings similar to those shown 6. The case 2 can have a flanged port 3 for an "exterior" current collector 16, the flange accommodating a seal and/or electrical insulation. The intake end cap 4 and exhaust end cap 10 are identical except for accommodation of the interior electrical terminal 14, which can be located wherever it may be convenient, such as at either or both end caps 4, 10.

FIGS. 2a-4 show embodiments of the invention wherein the tubes 18 are stacked in a close packed configuration with the outer metallic surfaces (porous metal support tube 111) of the tubes 18 in contact with one another. FIGS. 2b and 2c show, respectively, rectangular 17 and honeycomb 17' close packed configurations for fuel cell assemblies in accordance with the present invention. Also shown are respective interstices 19, 19'.

In the close packed configuration one or more metallic bands 22 can be used to help support the stack 15 of tubes 18. The bands 22 are electrically isolated from the case 2; such isolation can be achieved by conventional means such as an air gap or electrical insulation attached to the bands 22 and/or the case 2. Moreover, the stack can be wrapped with electrical insulation.

Since the metallic outer surfaces of the tubes 18 are all in axial contact with each adjacent tube 18, the tubes 18 provide contiguous current flow throughout the stack 15. The bands 22 and/or current collector plate 20 provide a common electrical connection (busbar) to the "exterior" electrical terminal 16. The "exterior" electrical terminal 16 extends through an opening 3 in the case 2 and is electrically isolated therefrom by an insulator 24.

The stack 15 is further supported on each end by various functional components. The first such component is an insulator 30 such as aluminum oxide or other high-temperature material that prevents contact between the ends of the tubes 18 and a header 28. The insulator 30 defines a first array of holes 40 that provide passage to the interiors of the tubes 18 and a second array of holes 42 that provide passage to the interstices 19. In the instant embodiment of the invention, the interstices 19 include the space around the outside of the stack 15 and inside the case 2.

The second component is an electrically conductive header 28 that has two integral faceplates 44, 46 separated by a fuel plenum 48. An outer faceplate 44 faces the intake end cap 4; the space therebetween is an air plenum 54. An inner faceplate 46 faces the insulator 30. The header also has passthroughs 50 that provide communication between the air plenum 54 and interiors of all of the tubes 18. The fuel plenum 48 interconnects all of the interstices 19 through holes 52 in the inner faceplate 46, which align with insulator second holes 42. The pass-throughs 50 have extensions 56 that extend from the inner faceplate 46 and insert into the tubes 18, contacting the interior surface thereof.

The header 28 serves as or supports an interior busbar, and includes the interior electrical terminal 14, which is preferably integral with the header 28, but can be a discrete component. The extensions 56 are current collectors.

The header 28 is important to the invention, directing air into the tubes 18, directing fuel around the tubes 18, and providing electrical connections to the tube 18 interiors. In the configuration described hereinabove, the exteriors of the tubes 18 are bathed in fuel (hydrogen), preventing oxidation of the metallic components thereof. The interiors of the tubes 18 are bathed with air. The electrochemical reaction to produce electricity is a result of oxygen transport through the tube 18 (fuel cell) membrane and the reaction of the oxygen with the hydrogen at the membrane interface on the fuel side of the tube 18.

The third component is an insulator 32 that protects the header 28 from electrical contact with the case 2 and end-cap 4. The insulator 32 includes an extension 62 for the interior electrical terminal 14 and a fuel opening 64. The insulator also seals the fuel plenum 48.

The fourth component is the end cap 4, which includes openings 6 to admit air into the unit 1, a fuel inlet 8, a port 9 for the interior electrical terminal 14, and a sealing connection to the case 2, such as a slot 68. If the end cap 4 is made of an insulating material, the end cap 4 and the insulator 32 can be integral and/or the cap can serve as the insulator. The support means also includes the case 2.

Figure 5:
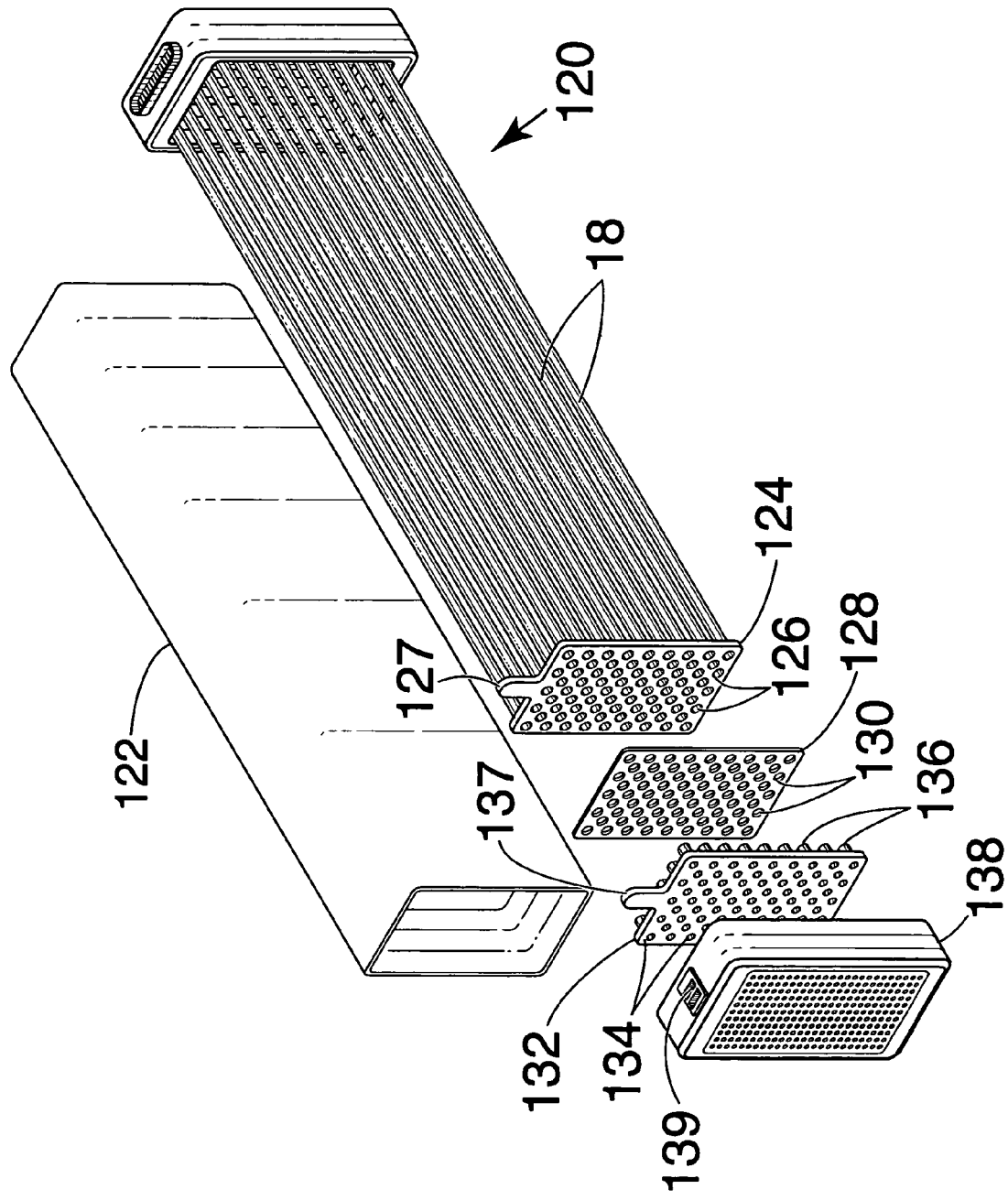
FIG. 5 is an oblique, exploded view of a fuel cell assembly in accordance with the present invention wherein the tubes are stacked in an open packed configuration.
Figure 6:
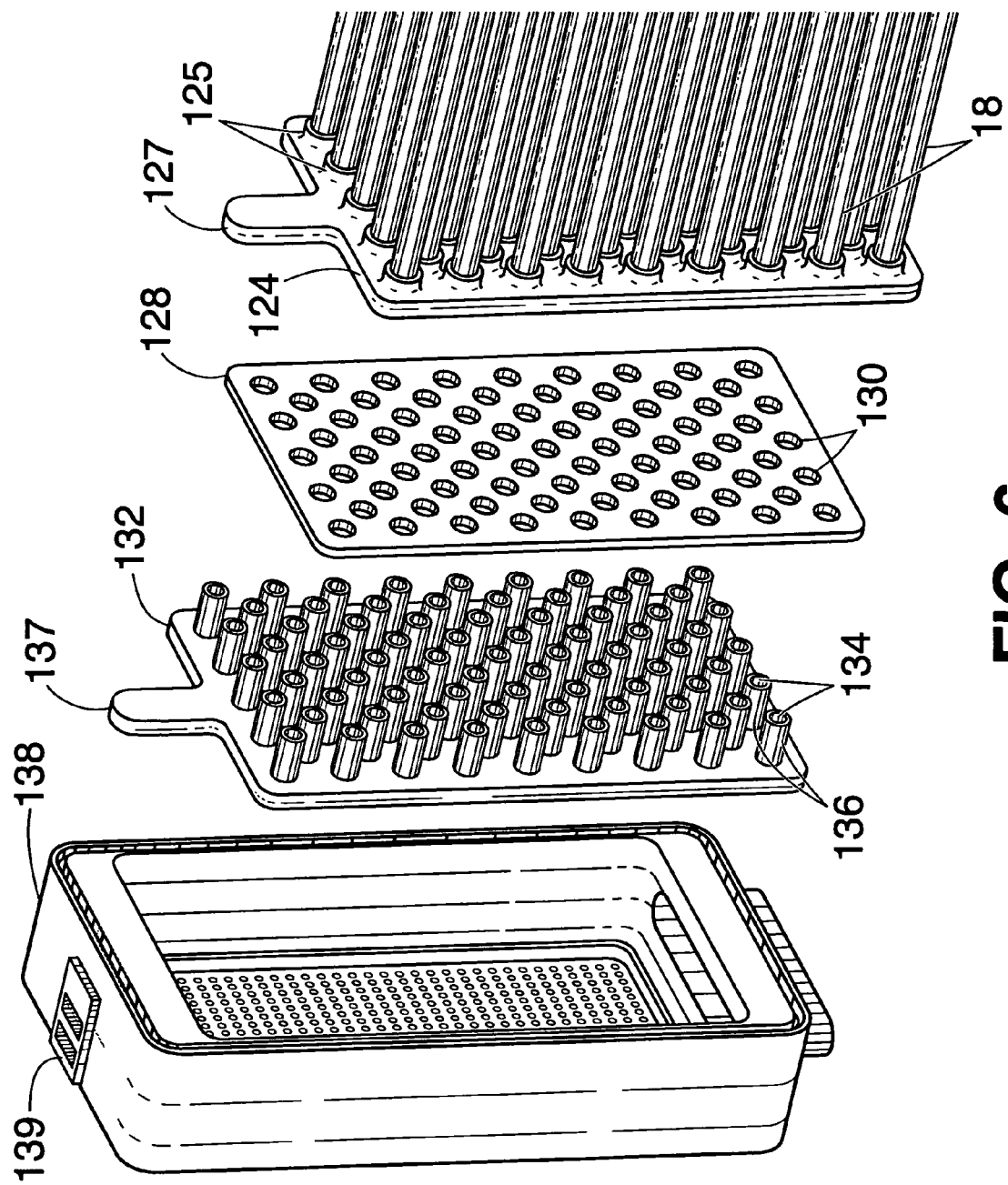
FIG. 6 is an oblique, exploded, partial view of a fuel cell assembly in accordance with the present invention wherein the tubes are stacked in an open packed configuration.
Figure 7:
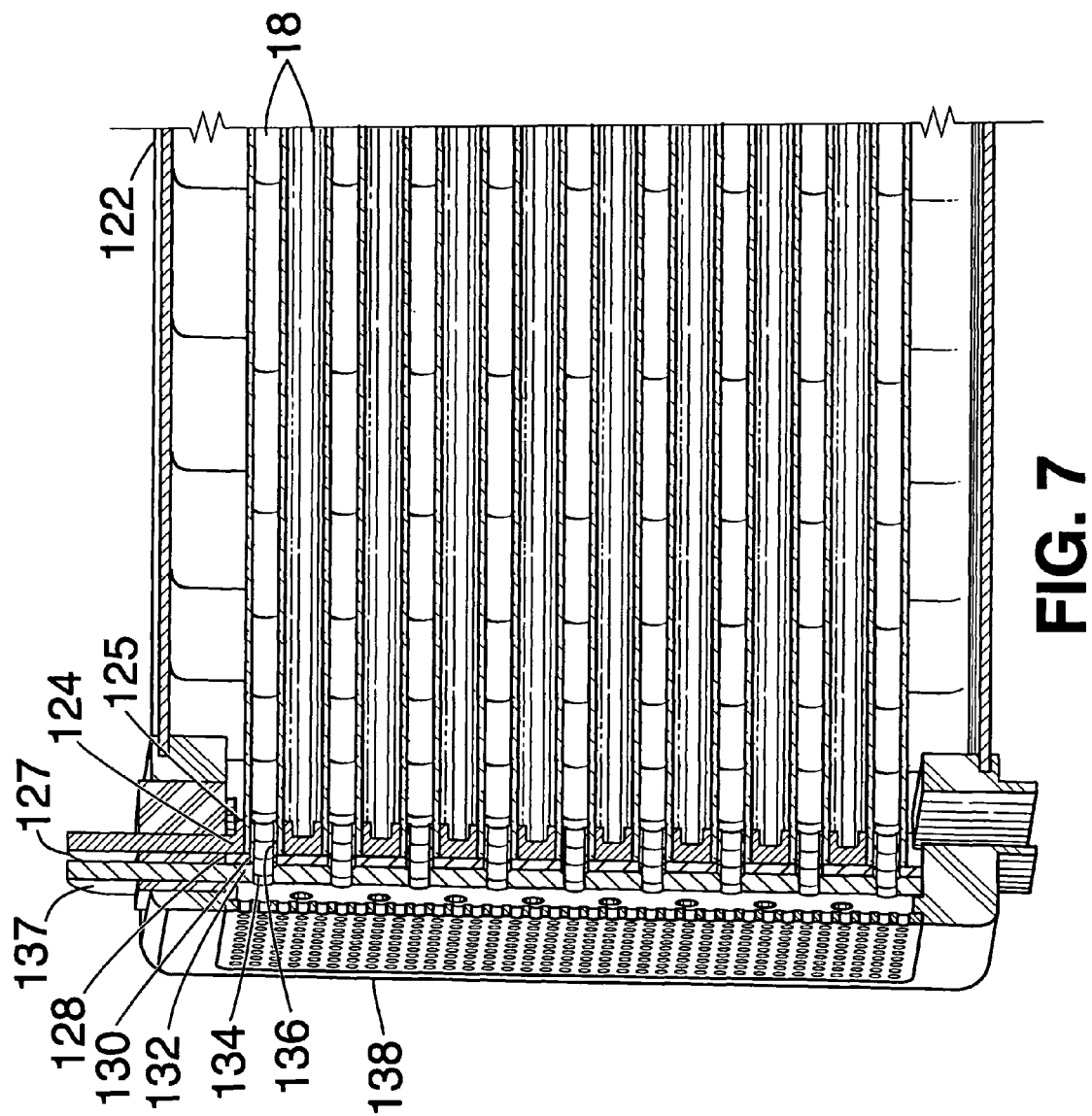
FIG. 7 is an oblique, cutaway, partial view of a fuel cell assembly in accordance with the present invention wherein the tubes are stacked in an open packed configuration.

FIGS. 5-7 show an embodiment of the invention wherein the tubes 18 are stacked in an open packed configuration. In the open packed configuration stack 120, the outer metallic surfaces of the tubes 18 are spaced apart and are not in contact with one another. The tubes 18 are held in respective positions in the stack 120 by the components at each end thereof. The stack 120 is enclosed by a case 122.

The stack 120 is enclosed on each end by a support means that can include various functional components. The first such component is an exterior busbar 124 that is in electrical communication with the outer, metallic components of the tubes 18. The exterior busbar 124 has openings 126 that align with the tubes 18 for allowing air to enter therethrough. The exterior busbar 124 can have posts, wings, flanges, or other type of extensions 125 that are associated with the openings 126 and extend over the tubes 18 and contact the exterior surfaces thereof of to provide electrical communication therewith. The exterior busbar 124 can be brazed, welded, press-fit, or otherwise robustly attached onto each tube 18 in order to hold the stack 120 together and/or provide dependable electrical connection. Other plates (not illustrated) similar in shape to the exterior busbar 124, either conducting or non-conducting, can be used to support the tubes between the ends thereof. The exterior busbar 124 can have an integral terminal 127 such as a tab, prong, or post, for example.

The next component is an insulator 128 having openings 130 that align with the tubes 18 for allowing air to enter therethrough. The insulator 128 seals against the exterior busbar 124.

The next component is an interior busbar 132 having openings 134 that align with the tubes 18 for allowing air to enter therethrough. The interior busbar 132 seals against the insulator 128, which prevents electrical contact between the exterior busbar 124 and the interior busbar 132. The interior busbar 132 has posts, wings, flanges, or other type of extensions 136 that are associated with the openings 134 and extend into the tubes 18 and contact the interior surfaces thereof of to provide electrical communication therewith. The interior busbar 132 can be brazed, welded, press-fit, or otherwise robustly attached into each tube 18 in order to hold the stack 120 together and/or provide dependable electrical connection. The interior busbar 132 can have an integral terminal 137 such as a tab, prong, or post, for example.

The next component is an end cap 138 which is either insulating or includes an insulating (i.e., electrically insulating) inner liner to prevent electrical contact and subsequent shorting of the busbars 124, 132. A component like the insulator 32 described above can be used. The end cap 138 can have the same or similar features as the end cap 4 described above. The end cap 138 can have an insulating terminal support 139 to accommodate the terminals 127, 137. The insulating terminal support 139 can be a grommet, an interlocking connector, or any other structure that provides at least one of ease of assembly, terminal support, insulation, reinforcement, and fastening.

The exterior busbar 124, insulator 128, and interior busbar 132 can be integrated into a single component having a plurality of layers. The insulator can serve as a support for the tubes, and can have conductive (for example, metal) coatings on either side to serve as busbars 124, 132.

Figure 9:
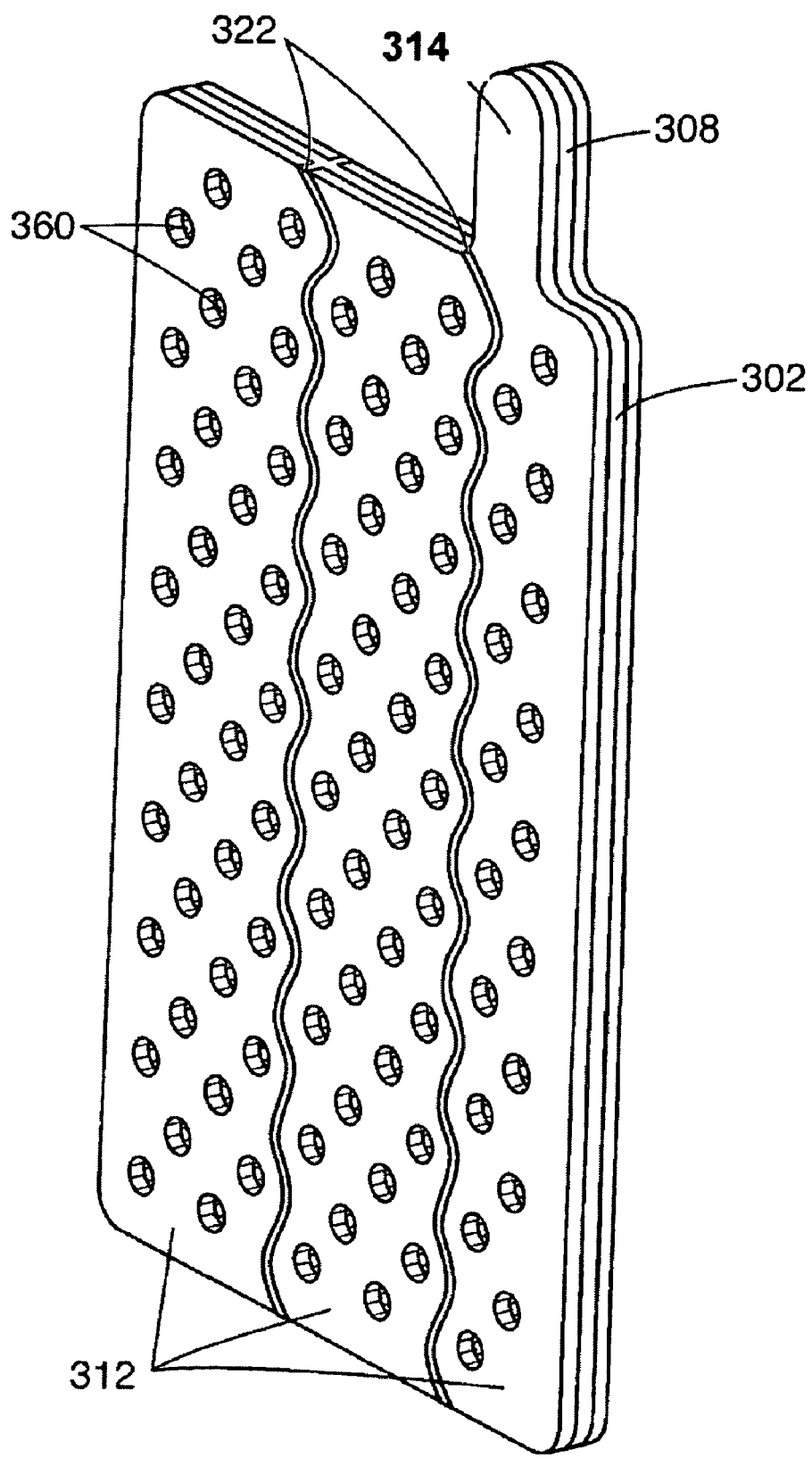
FIG. 9 is a schematic end view of a fuel cell tube assembly in accordance with the present invention wherein the tubes are stacked in a semi-close packed configuration.
Figure 10:
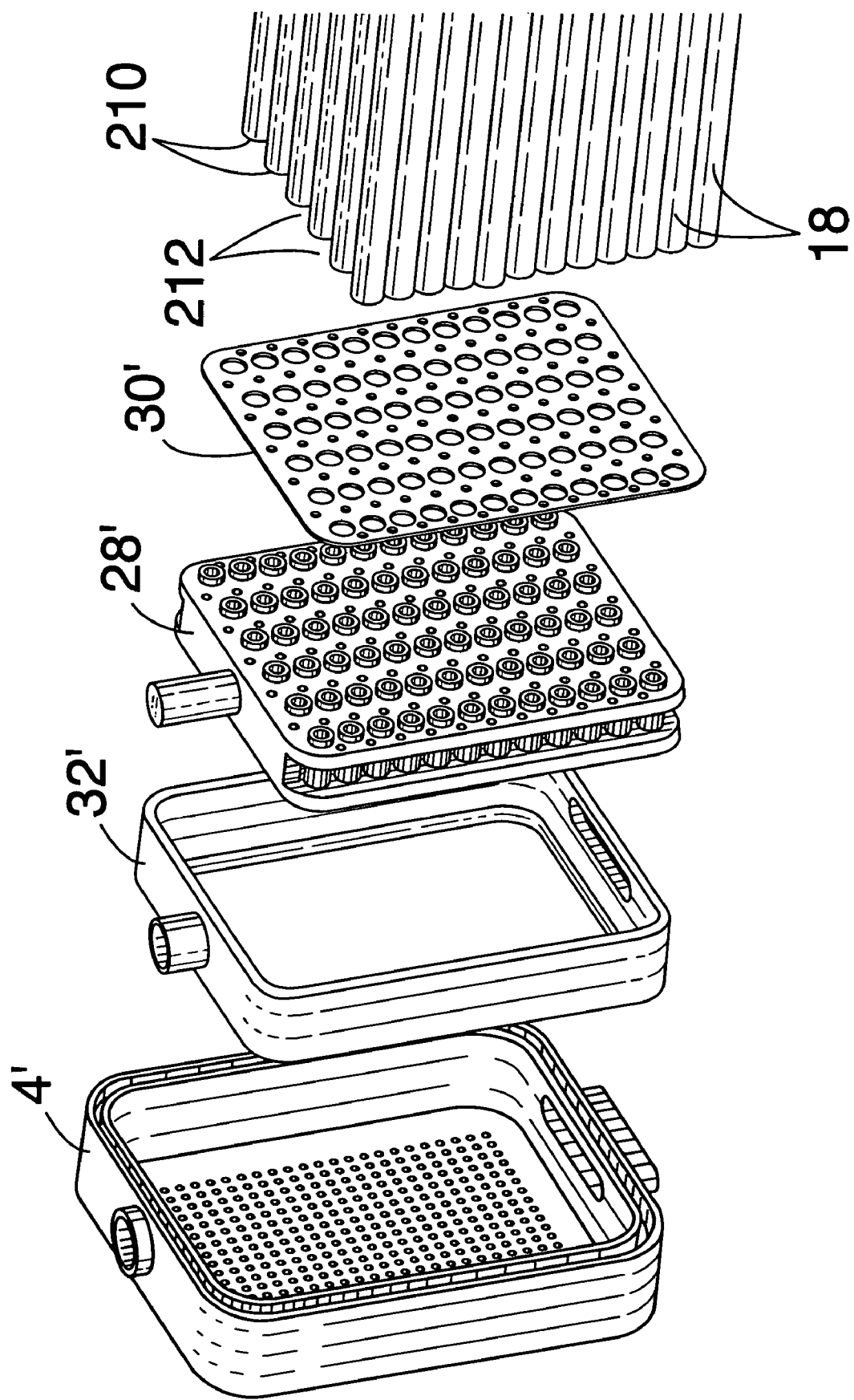
FIG. 10 is an oblique, exploded, partial view of a fuel cell assembly in accordance with the present invention wherein the tubes are stacked in a semi-close packed configuration.

FIGS. 9, 10 show an embodiment of the invention wherein the tubes 18 are stacked in a semi-close packed configuration with the outer metallic surfaces of the tubes 18 in contact with one another in sub-stacks 210 separated by gaps 212. The sub-stacks 210 can act as parallel resistors, resulting in a higher current flow through the unit. Other than having a wider profile in order to accommodate the gaps 212, the functional end-components can be essentially the same as described above for the close packed configuration, including the insulator 30', header 28', insulator 32', and end cap 4'.

Figure 11:
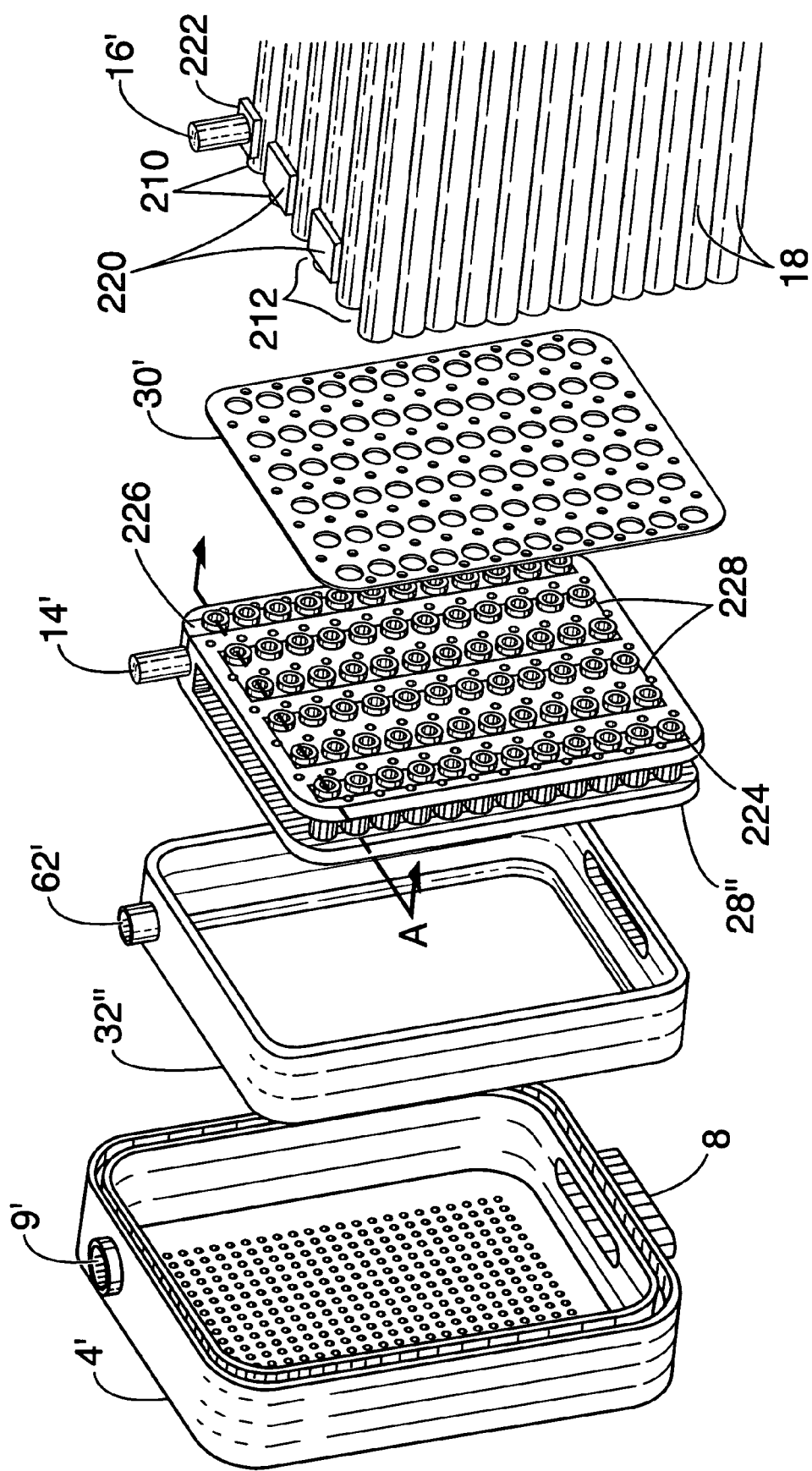
FIG. 11 is an oblique, exploded, partial view of a fuel cell assembly in accordance with the present invention wherein the tubes are stacked in a semi-close packed configuration and connected in series.
Figure 12:
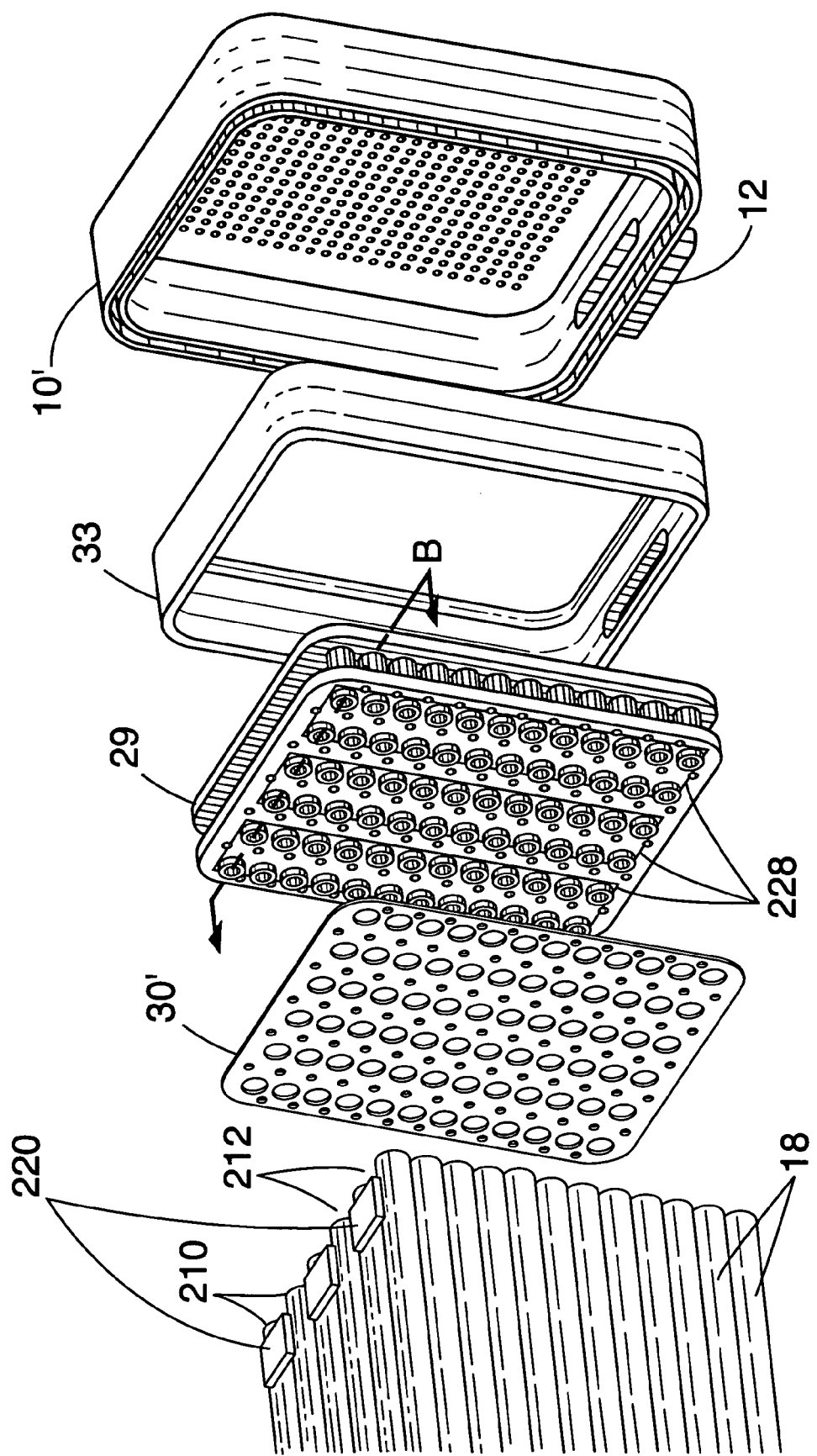
FIG. 12 is an oblique, exploded, partial view of the other end of the fuel cell assembly shown in FIG. 11.
Figure 13:
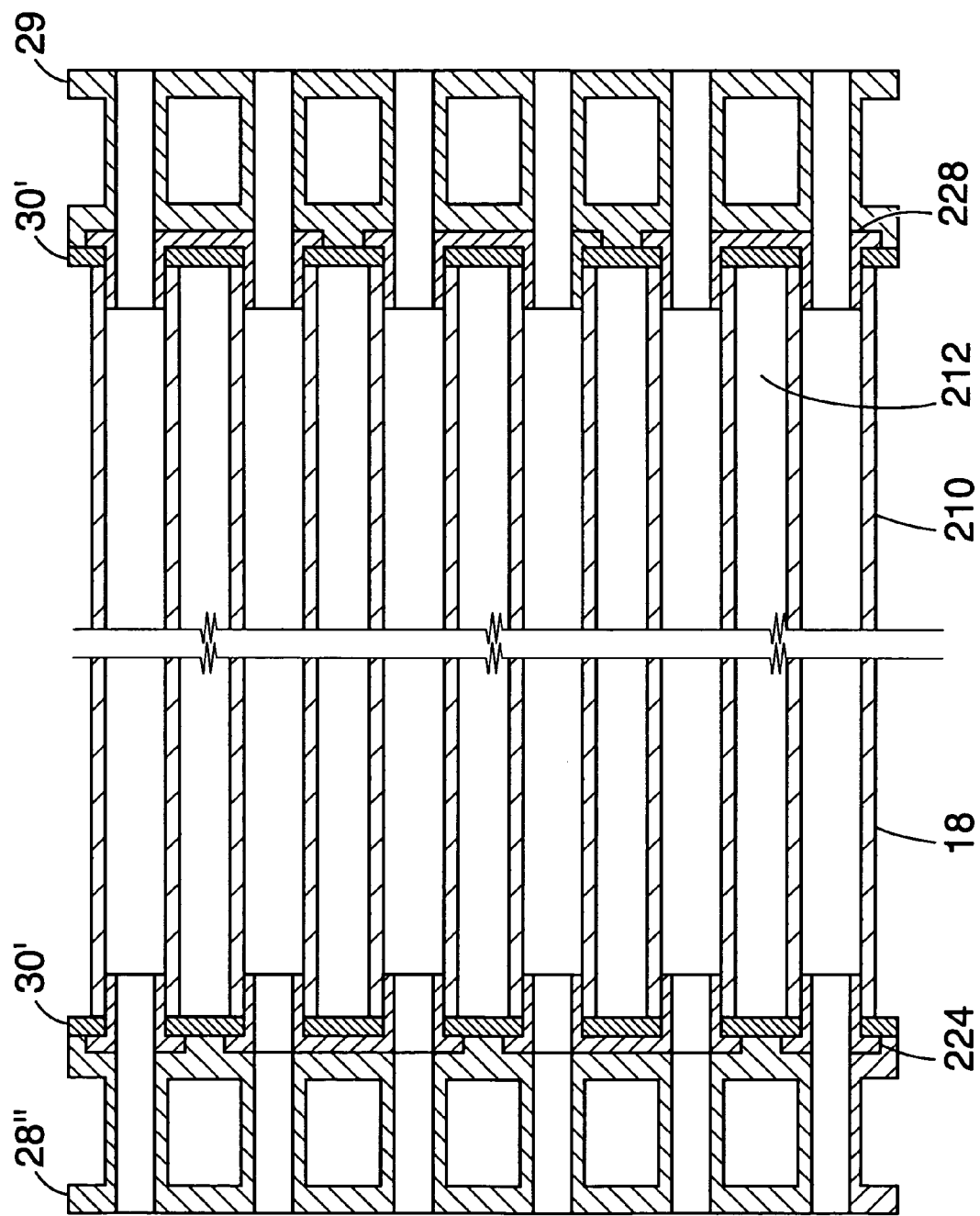
FIG. 13 is a partial, top view through cutaway sections A of FIG. 11 and B of FIG. 12.
Figure 14:
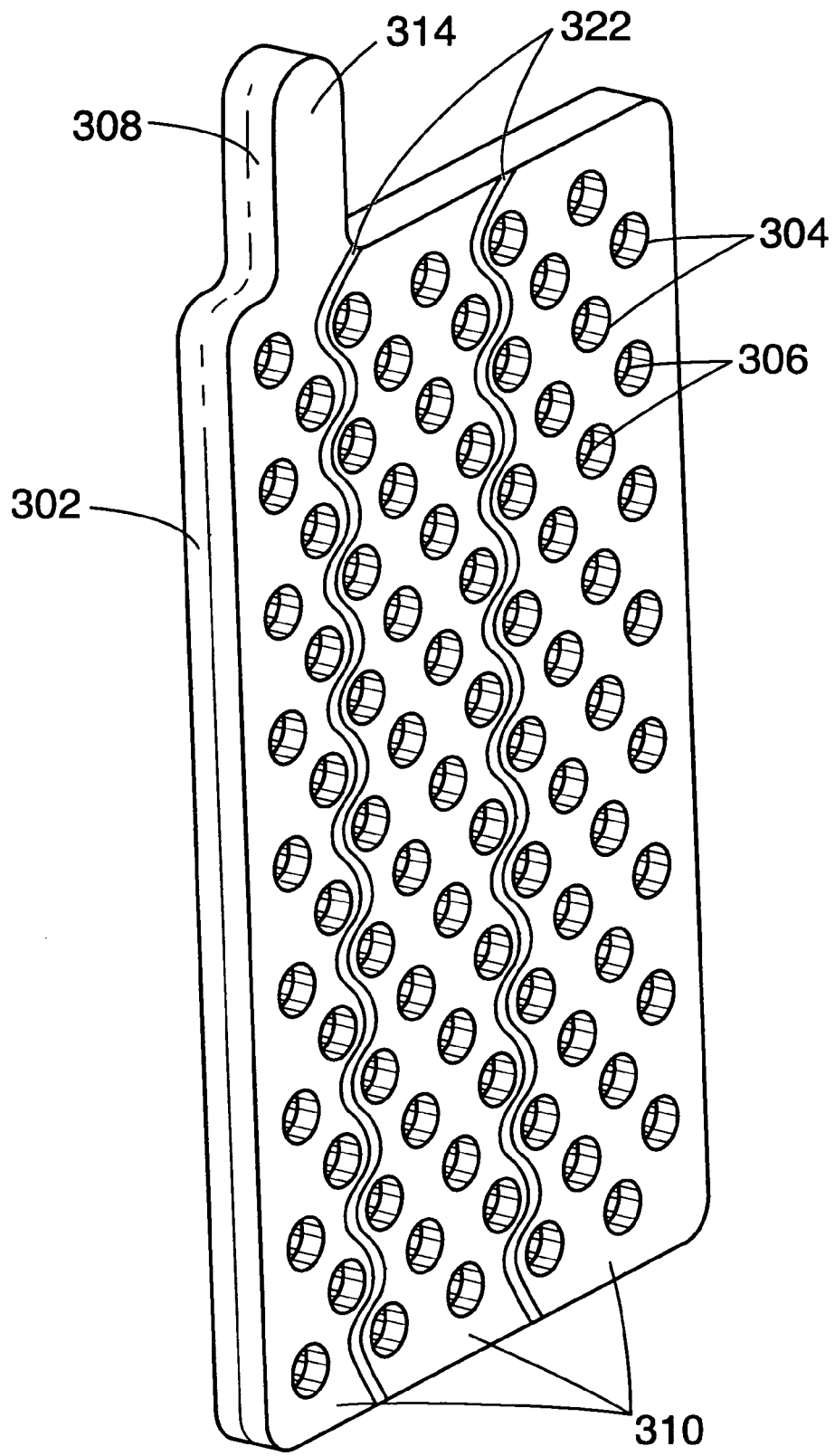
FIG. 14 is an oblique view of a header in accordance with the present invention wherein the tubes are stacked in an open packed configuration and connected in series.
Figure 15:
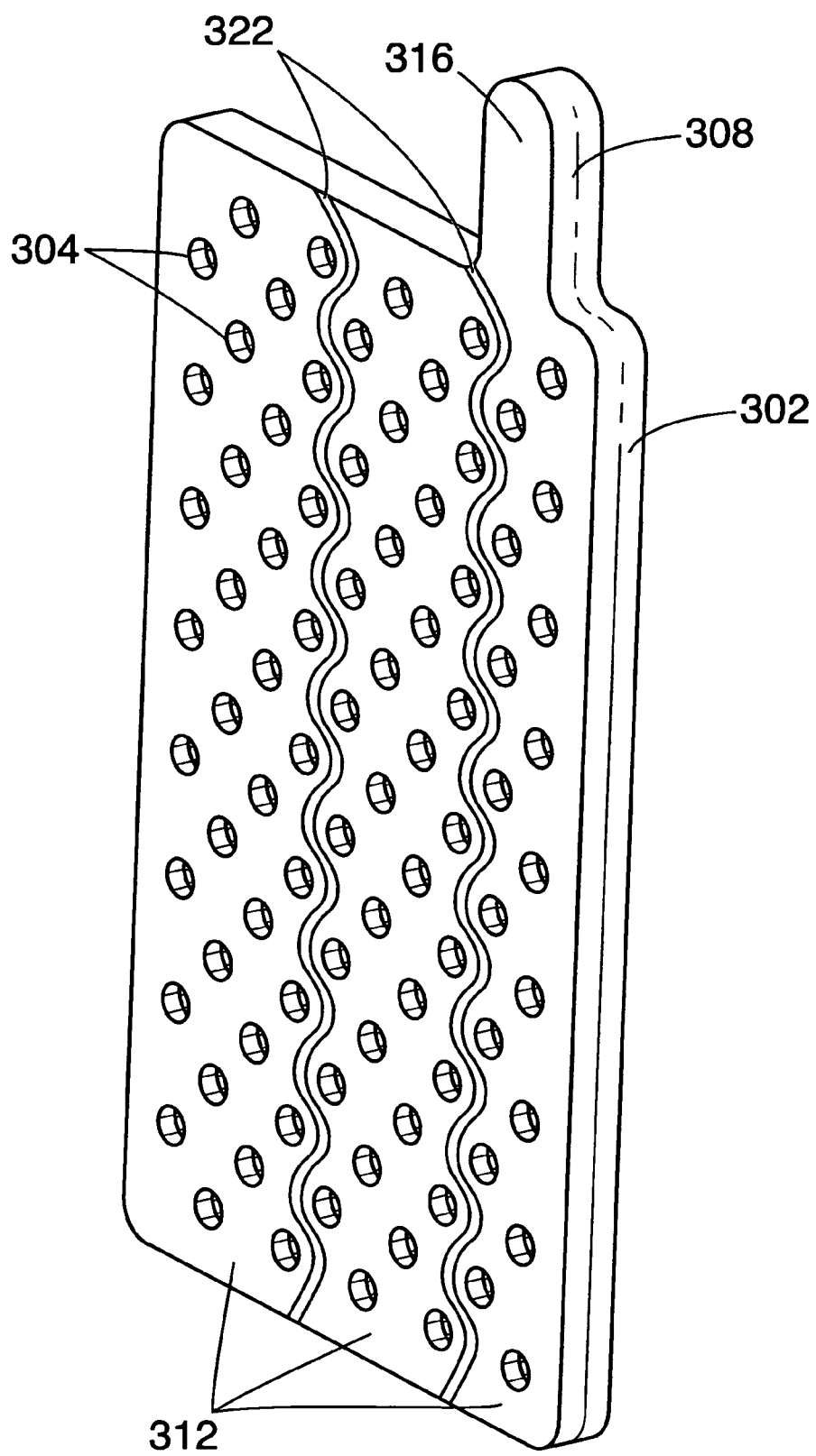
FIG. 15 is an oblique view of a the other side of the header shown in FIG. 14.
Figure 16:
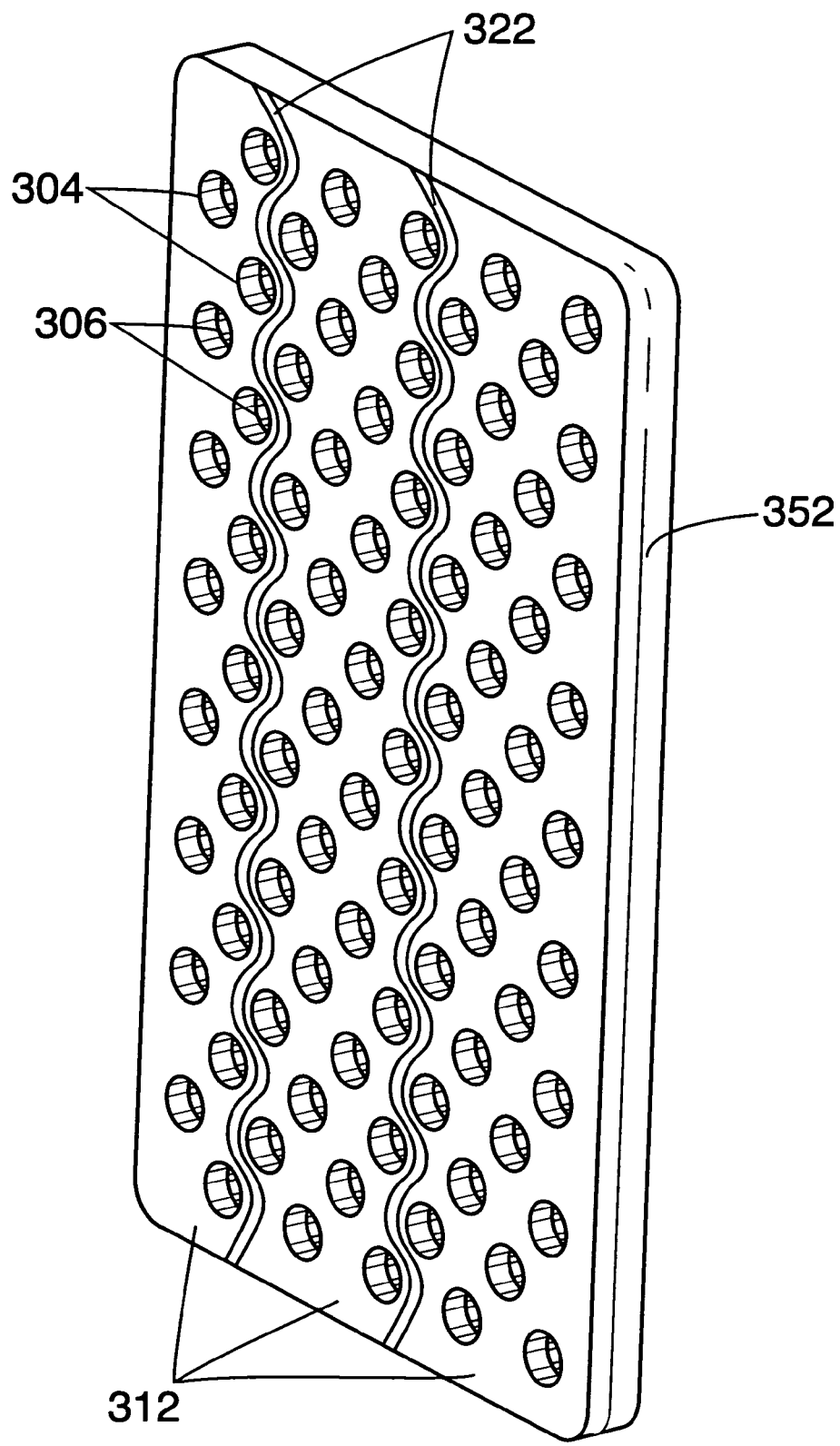
FIG. 16 is an oblique view of a header of the other end of a fuel cell assembly from the header shown in FIG. 14.
Figure 17:
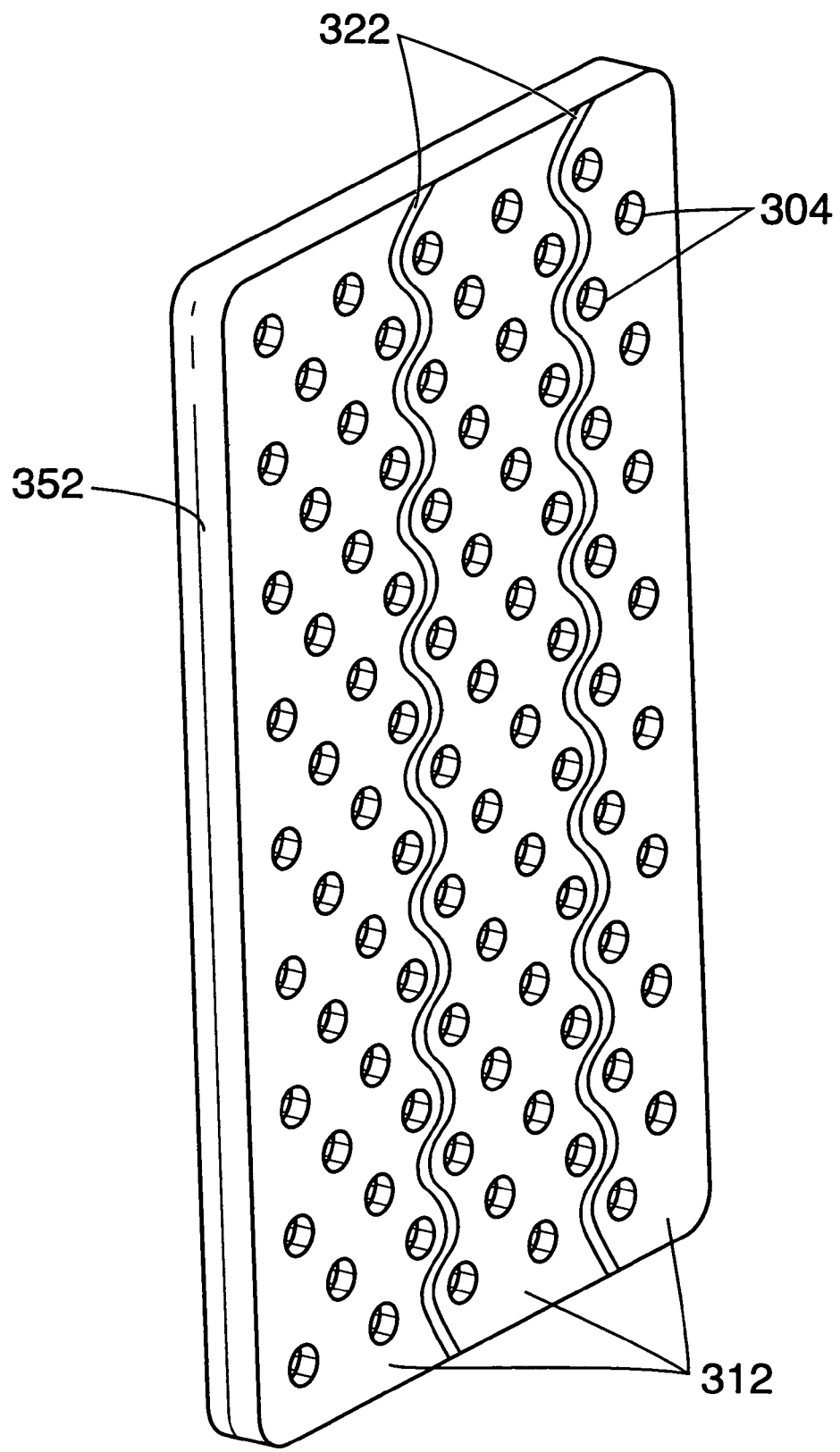
FIG. 17 is an oblique view of a the other side of the header shown in FIG. 16.
Figure 18:
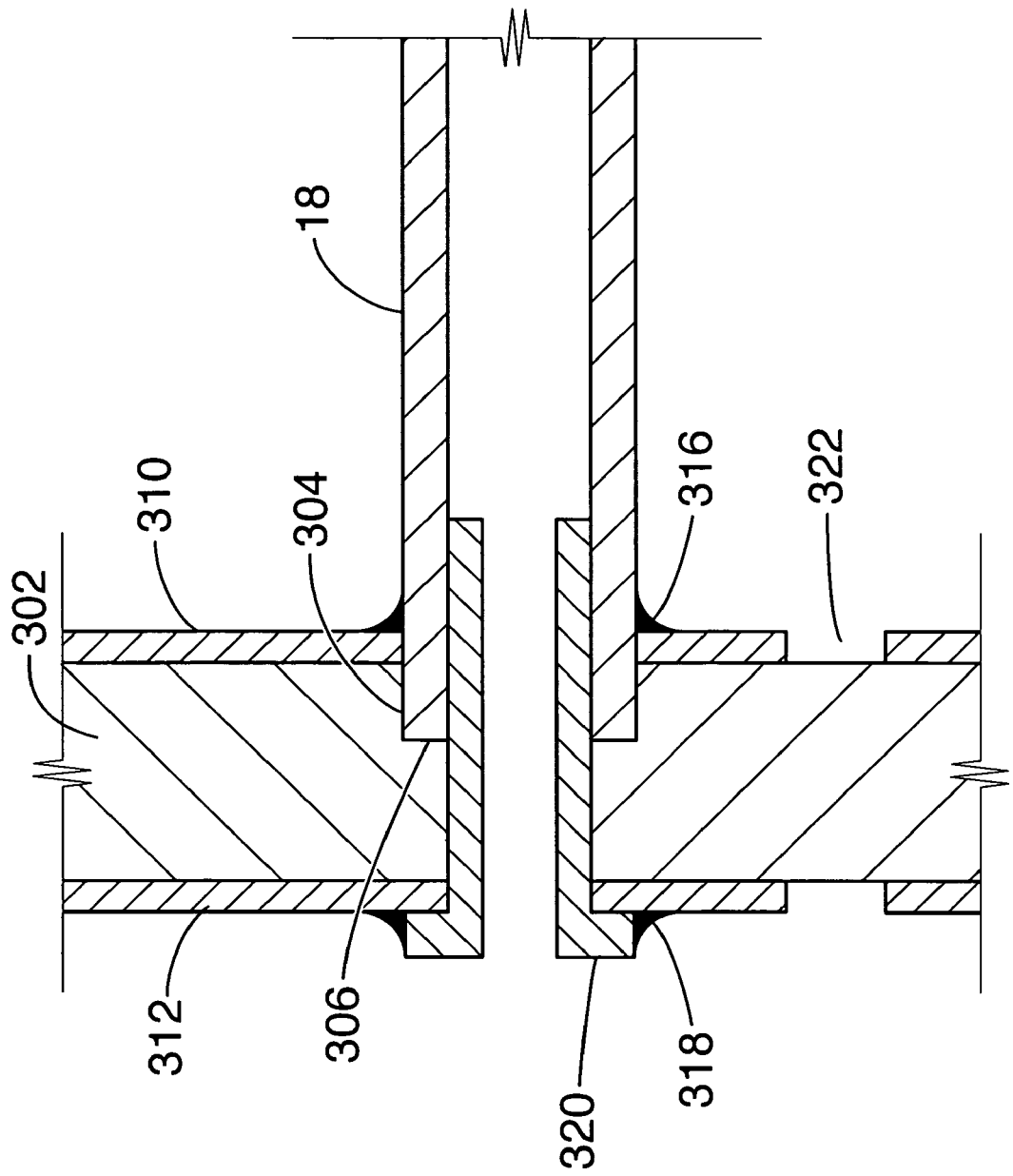
FIG. 18 is a cutaway axial view through one of the holes in the header shown in FIG. 14.

FIGS. 11-13 show an embodiment of the invention wherein the tubes 18 are stacked in a semi-close packed configuration similar to that described above, but wherein the sub-stacks 210 are connected in series to provide increased control over the total voltage and amperage supplied by the unit. The number of tubes 18 in each sub-stack 210 determines the available amperage supplied by the unit, and the number of sub-stacks 210 connected in series determines the available voltage supplied by the unit.

The exterior busbar comprises a plurality of components in order to provide series connections. Any suitable series connection means can be used; soldered or brazed tabs 220 are shown as an example for connecting a pair of tubes 212. Other suitable connection means include, but are not limited to wires, strips, plates, rods, overlay, inlay, and the like. The exterior electrical terminal 16' can be connected to one of the ends of the series of sub-stacks 210 directly or by any suitable connection means, shown as a soldered or brazed tab 222 as an illustration.

The interior busbar comprises a plurality of conductive components in order to provide series connections. Any suitable series connection means can be used; conductive inlays 224, 228 that are integral with insulating header 28', 29 are shown as an example. The free ends of the first and last sub-stacks 210 can be connected in parallel by single-row inlays 224, one of which has an extension 226 that connects to the "interior" electrical terminal 14'. The sub-stacks 210 are connected in series by double-row inlays 228, which also provide parallel connections within each sub-stack 210. The conductive components 224, 228 can comprise any suitable structures. Other examples of conductive components include, but are not limited to tabs, wires, strips, plates, rods, overlay, and the like. Other functional end-components can be essentially the same as described above for the semi-close packed configuration, including the respective insulators 30', headers 28", 29, insulators 32", 33 and end caps 4', 10'. A flanged port 9', an extension 62', and an insulator 30' can be provided.

In another embodiment of the present invention, the open packed configuration shown in FIGS. 5-7 can be connected in series by modifications similar to the immediately preceding embodiment. The skilled artisan will recognize that the available options and combinations for connecting the fuel cell tubes in parallel and series are numerous because individual tubes can be connected in either series or parallel throughout the stack.

For example, referring to FIGS. 14-18, series connection of an open packed configuration can be accomplished by using robust, insulating support plates 302, 352, to support the tubes on either end of the stack. One of the insulating support plates further includes accommodation of an electrical terminal; a terminal tab 308 is used in the example shown.

The tubes 18 fit into counter-bored holes 304 that have shoulders 306 to insulate the ends of the tubes. The exterior busbars 310 and interior busbars 312 are adherently disposed on respective sides of the support plates 302, 352 in patterns with gaps 322 as shown that connect the tubes 18 in series and parallel as desired. The patterns shown connect the tubes 18 in parallel vertical stacks which are connected in series horizontally. Further, horizontal fragmentation of the busbars 310, 312 would result in fewer parallel connections and more series connections. The exterior busbars 310 and interior busbars 312 extend over respective sides of the terminal tab 308 to provide external electrical connections to a mating connector (not illustrated).

Solder joints 316, 318 can be used to fasten the exterior busbars 310 to the exteriors of the tubes 18 and provide electrical connection thereto. Hollow pins such as rivets 320 can be used to pass through the holes 304 and provide electrical connection to the interiors of the tubes 18. Solder joints 316 can be used to fasten the rivets 320 to the interior busbars 312. A tab 314 can be provided.

The skilled artisan will recognize that fuel and air inlets described above are of a typical nature, and can be of any suitable size, shape, configuration, and/or location on the unit. Moreover, the skilled artisan will recognize that electrical terminals described in all of the embodiments above are of a typical, conventional nature, and can be of any suitable size, shape, configuration, and/or location on the unit. The terminals can be battery posts or can be incorporated into one or more electrical plugs, connectors, sockets, and/or the like. The terminals can be connected to the current collectors by any suitable conventional means, such as, for example, wires, plates, strips, and the like.

Features of the present invention provide advantages of sealing as the metallic support allows for the use of brazes and welds.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A fuel cell unit, comprising:
   a. an array of solid oxide fuel cell tubes, each of said tubes having a porous metallic support structure with porous metallic exterior surfaces and porous metallic interior surfaces, a porous first electrode layer radially inside and coated on said porous metallic interior surfaces, a dense electrolyte layer radially inside and coated on said porous first electrode layer, and a porous second electrode layer radially inside and coated on said dense electrolyte layer, said porous second electrode layer having an interior electrode surface;
   b. at least one header in operable communication with said array of solid oxide fuel cell tubes, said header including structure for directing a first reactive gas into contact with said porous metallic exterior surfaces and structure for directing a second reactive gas into contact with said interior electrode surfaces, said header further comprising at least one busbar selected from the group consisting of an exterior busbar disposed in electrical contact with each of said porous metallic exterior surfaces and an interior busbar disposed in electrical contact with each of said interior electrode surfaces.

2. A fuel cell unit in accordance with claim 1 wherein said header physically supports said array of solid oxide fuel cell tubes and wherein said at least one busbar comprises said exterior busbar disposed in electrical contact with each of said porous metallic exterior surfaces and said interior busbar disposed in electrical contact with each of said interior electrode surfaces.

3. A fuel cell unit in accordance with claim 1 wherein said header is integral with said exterior busbar.

4. A fuel cell unit in accordance with claim 1 wherein said header physically supports said exterior busbar.

5. A fuel cell unit in accordance with claim 3 wherein said header is integral with said interior busbar.

6. A fuel cell unit in accordance with claim 1 wherein said header physically supports said interior busbar.

7. A fuel cell unit in accordance with claim 1 wherein said header defines a plenum for directing said first reactive gas, and wherein said header further defines pass-throughs for directing said second reactive gas, said pass-throughs traversing said plenum.

8. A fuel cell unit in accordance with claim 1 wherein said array of solid oxide fuel cell tubes is configured in a close packed configuration.

9. A fuel cell unit in accordance with claim 1 wherein said array of solid oxide fuel cell tubes is configured in a semi-close packed configuration.

10. A fuel cell unit in accordance with claim 9 wherein said array of solid oxide fuel cell tubes is further configured to comprise sub-stacks of solid oxide fuel cell tubes, all of the solid oxide fuel cell tubes within each of said sub-stacks being electrically connected to each other in parallel.

11. A fuel cell unit in accordance with claim 10 wherein at least a portion of said sub-stacks are electrically connected to each other in series.

12. A fuel cell unit in accordance with claim 11 wherein said interior busbar further comprises a plurality of interior busbar components.

13. A fuel cell unit in accordance with claim 12 wherein said header further comprises an electrically insulating material that supports said interior busbar components.

14. A fuel cell unit in accordance with claim 11 wherein said exterior busbar further comprises a plurality of exterior busbar components.

15. A fuel cell unit in accordance with claim 14 wherein said header further comprises an electrically insulating material that supports said exterior busbar components.

16. A fuel cell unit in accordance with claim 1 wherein said array of solid oxide fuel cell tubes is stacked in an open packed configuration.

17. A fuel cell unit in accordance with claim 16 wherein at least a portion of said solid oxide fuel cell tubes are electrically connected in parallel.

18. A fuel cell unit in accordance with claim 16 wherein at least a portion of said solid oxide fuel cell tubes are electrically connected in series.

19. A fuel cell unit in accordance with claim 18 wherein a portion of said solid oxide fuel cell tubes are electrically connected in parallel.

* * * * *